United States Patent [19]
Mittenthal

[11] Patent Number: 6,035,042
[45] Date of Patent: Mar. 7, 2000

[54] HIGH SPEED AND METHOD OF PROVIDING HIGH SPEED TABLE GENERATION FOR BLOCK ENCRYPTION

[75] Inventor: Lothrop Mittenthal, Thousand Oaks, Calif.

[73] Assignee: Allegheny Teledyne Inc., Pittsburg, Pa.

[21] Appl. No.: 08/988,173

[22] Filed: Dec. 10, 1997

[51] Int. Cl.$^7$ ...................................................... H04L 9/06
[52] U.S. Cl. .............................................. 380/37; 380/28
[58] Field of Search ................................. 380/28, 29, 37, 380/42, 59

[56] References Cited

U.S. PATENT DOCUMENTS

| | | | |
|---|---|---|---|
| 4,776,011 | 10/1988 | Busby | 380/37 |
| 5,003,596 | 3/1991 | Wood | 380/37 |
| 5,619,576 | 4/1997 | Shaw | 380/44 |
| 5,623,549 | 4/1997 | Ritter | 380/37 |
| 5,647,001 | 7/1997 | Mittenthal | 380/37 |
| 5,778,074 | 6/1998 | Grcken et al. | 380/37 |

OTHER PUBLICATIONS

Mittenthal, L. "A Source of Cryptographically Strong Permutations for Use in Block Ciphers" Proceeding of IEEE, International Symposium on Information Theory 1993, p. 233.

Mittenthal, L. "Block Substitutions Using Orthomorphic Mappings" Advances in Applied Mathematics vol. 16, No. 1 (1995) pp. 59–71.

*Primary Examiner*—Pinchus M. Laufer
*Attorney, Agent, or Firm*—Blakely, Sokoloff, Taylor & Zafman

[57] ABSTRACT

The present invention is an apparatus and method of encryption. A first table comprising a set of $2^n$ distinct n-bit input numbers and a first set of $2^n$ distinct n-bit output numbers is received. A second table comprising of the set of $2^n$ distinct n-bit input numbers and a second set of $2^n$ distinct n-bit output numbers is also received. The first and second sets of $2^n$ n-bit output numbers are each a one-to-one mapping of the set of $2^n$ n-bit input numbers, and the second mapping of $2^n$ n-bit output numbers is disjoint from the first mapping of $2^n$ n-bit output numbers. The first and the second tables are combined and a fourth table of $2^n$ pairs of (n+1)-bit numbers is generated by converting each of the $2^n$ pairs of n-bit input numbers and each of the $2^n$ pairs of n-bit output numbers in the third table, to (n+1)-bit numbers. Clear text (n+1)-bit data is then encrypted by providing the (n+1)-bit clear text data as inputs to the fifth table to obtain cipher text (n+1)-bit numbers as outputs.

34 Claims, 4 Drawing Sheets

FIG.2

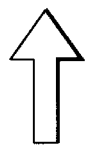

TABLE I
$X_0 \rightarrow f(X_0)$
$X_1 \rightarrow f(X_1)$
$\cdots$
$X_k \rightarrow f(X_k)$
$\cdots$
$X_m \rightarrow f(X_m)$ TABLE II
$X_0 \rightarrow g(X_0)$
$X_1 \rightarrow g(X_1)$
$\cdots$
$X_k \rightarrow g(X_k)$
$\cdots$
$X_m \rightarrow g(X_m)$ TABLE III
$X_0 \rightarrow f(X_0) = Z_0$
$X_0 \rightarrow g(X_0) = Z_1$
$X_1 \rightarrow f(X_1) = Z_1$
$X_1 \rightarrow g(X_1) = Z_2$
$\cdots$
$X_k \rightarrow f(X_k) = Z_k$
$X_k \rightarrow g(X_k) = Z_{k+1}$
$\cdots$
$X_m \rightarrow f(X_m) = Z_{m-1}$
$X_m \rightarrow g(X_m) = Z_m$

HIGH SPEED AND METHOD OF PROVIDING HIGH SPEED TABLE GENERATION FOR BLOCK ENCRYPTION

BACKGROUND OF THE INVENTION

1. Field of the Invention

The present invention relates in general to data processing, and more particularly, to an apparatus and method of providing high speed table generation for block encryption.

2. Description of the Related Art

Encryption techniques are generally implemented in the transmission of digital information to conceal information from unintended recipients and for authenticating messages to assure the recipient of sender identity. Encryption is also used for digital signatures, to authenticate and assure the recipient that any third party could not have created the signature. As in physical security systems, encryption provides assurance of integrity including prevention of interference in the information-conveying process or failing that, detecting interference. Interference in this context includes eavesdropping, modifying, introducing misinformation, disavowing messages and falsely claiming receipt of messages.

Almost all cryptosystems involve transformation of information based on one or more keys, at least one of which must be kept secret to protect against adversaries. Block substitution is an encryption process used to encrypt a clear text message which is in the form of a sequence of binary numbers. Typically, a block substitution system consists of alternating steps of encrypting conveniently-sized sub-blocks in individual substitution boxes (S-boxes) and permuting the partly encrypted data. Substitute blocks constitute the encrypted message or cipher text, each substitute block representing a non-ambiguous one-to-one transformation of a clear text block. After dividing the block of clear text into sub-blocks and encrypting the sub-blocks, the encrypted sub-blocks are typically reassembled into a block and the bits in the full block are permuted. The resulting block is again subdivided into sub-blocks for another round of encryption. As shown in FIG. 1, this process of substitution-permutation-substitution is repeated a number of times.

In many systems like DES and its variations, these individual S-boxes are fixed. In such systems, the tables might as well be publicly known, as they will be eventually revealed with the passage of time. In DES-like systems, the key interacts with the data. The S-boxes have the vital role of acting as a barrier to prevent the cryptanalyst from using matching clear text/cipher text pairs to find bits of the key. The S-box tables in such systems have to be designed with great care and thoroughly tested before selection as permanent parts of the algorithm.

An alternate approach involves the use of one-time tables in the S-boxes. These tables are selected by the key, kept secret or at least not made public, and changed as frequently as the key is changed. This approach presents several challenges. First of all, it must be possible to find a selection of S-box tables that are known to be of good quality without testing. Secondly, the supply of such tables must be very large so that duplication is unlikely. Related to the first requirement is the fact that the cryptographic community demands that cryptographic strength be assessed not only by empirical testing but also by underlying mathematical theory. The so-called spaghetti algorithms that are very complex but without any recognizable mathematical structure are viewed with skepticism. Despite having passed standard tests with flying colors there is the lingering doubt that there may be exploitable weaknesses lurking in the murky complexity.

U.S. Pat. Nos. 5,038,376, 5,214,704, 5,317,639 and 5,647,001 disclose cryptographic block substitution systems in which dynamic substitution devices (DSD) are used as substitution boxes (S-boxes). In these substitution systems, orthomorphic mapping is applied. In particular, U.S. Pat. Nos. 5,038,376, 5,214,704, 5,317,639 and 5,647,001 disclose methods for generating orthomorphic mapping tables of good quality, in terms of cryptographic strength, and in ample quantities. However, the method covered by the first three patents were restrictive in the sense that not all possible orthomorphisms could be generated. Some of the methods permit more rapid generation than others which is important for some but not all applications. U.S. Pat. No. 5,647,001 includes the so-called bar sinister method. It can be shown mathematically that this method can generate all possible orthomorphisms. Further, using this method, we obtain the best quality in terms of measures of cryptographic strength. However, there is one drawback to the bar sinister method, namely, that it is relatively slow in generating tables. It may take several seconds to generate a table for 8-bit numbers, which is too long for some applications.

Accordingly, there is a need in the technology for an apparatus and method for providing high speed table generation for block encryption. There is also a need in the technology for an apparatus and method for generating mappings in general, and for generating orthomorphisms for block encryption, which have high cryptographic strength and which can be generated quickly and efficiently.

BRIEF SUMMARY OF THE INVENTION

The present invention is an apparatus and method of encryption. A first table comprising a set of distinct $2^n$ n-bit input numbers and a first set of distinct $2^n$ n-bit output numbers is received. The first set of $2^n$ n-bit output numbers is a one-to-one mapping of the set of $2^n$ n-bit input numbers. A second table comprising of the set of distinct $2^n$ n-bit input numbers and a second set of distinct $2^n$ n-bit output numbers is also received. The second set of $2^n$ n-bit output numbers is a one-to-one mapping of the set of $2^n$ n-bit input numbers, and the second mapping of $2^n$ n-bit output numbers is disjoint from the first mapping of $2^n$ n-bit output numbers. The first and the second tables are combined to provide a third table having $2^n$ pairs of n-bit input numbers and $2^n$ pairs of n-bit output numbers. A fourth table of $2^n$ pairs of (n+1)-bit numbers is generated by converting each of the $2^n$ pairs of n-bit input numbers and each of the $2^n$ pairs of n-bit output numbers in the third table, to (n+1)-bit numbers by inserting a bit position containing a zero in each of the $2^n$ pairs of n-bit input numbers and in each of the $2^n$ pairs of n-bit output numbers. A supplemental (n+1)-bit number containing a one in the same bit position and a zero in the remaining n-bit positions is then generated. The supplemental (n+1)-bit number is added to one of each pair of the $2^n$ pairs of (n+1)-bit input numbers and to one of each pair of the $2^n$ pairs of (n+1)-bit output numbers to obtain a fifth table. The fifth table comprises of a set of distinct $2^{n+1}$ (n+1)-bit input numbers and a set of distinct $2^{n+1}$ (n+1)-bit output numbers, the set of $2^{n+1}$-bit output numbers being a one-to-one mapping of the $2^{n+1}$ (n+1)-bit input numbers. Clear text (n+1)-bit data is then encrypted by providing the (n+1)-bit clear text data as inputs to the fifth table to obtain cipher text (n+1)-bit numbers as outputs.

BRIEF DESCRIPTION OF THE DRAWINGS

FIG. 2 illustrates one embodiment of the shuffling process of the present invention.

DETAILED DESCRIPTION OF THE INVENTION

Figure 1:
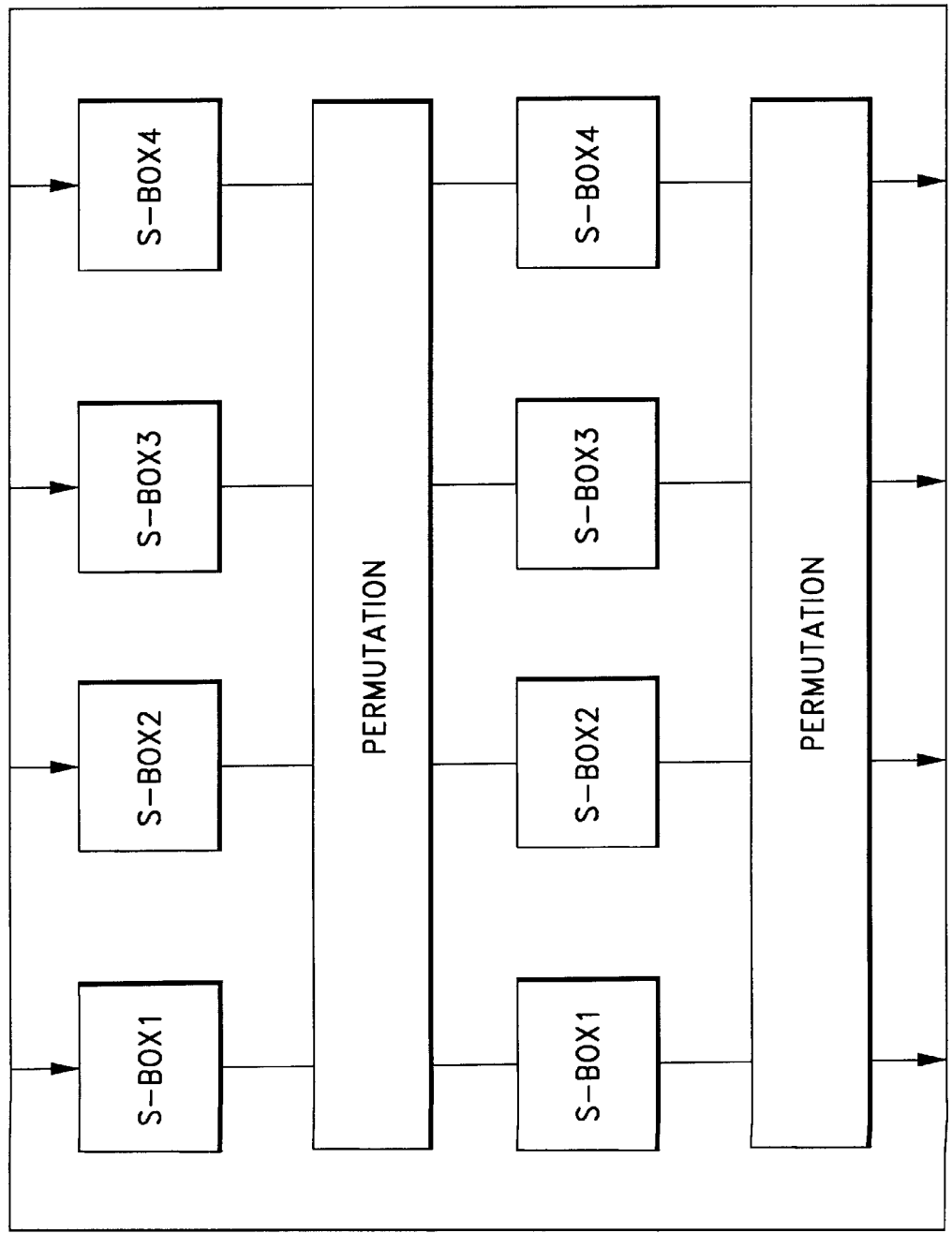
FIG. 1 is a block diagram illustrating the substitution/permutation method of encrypting data.

The present invention discloses an apparatus and methods for providing high speed table generation for block encryption. The methods of the present invention include generating nonlinear mappings in general, and linear and nonlinear orthomorphisms for block encryption, which have high cryptographic strength and which can be generated quickly and efficiently.

I. BACKGROUND

The present invention involves high speed table generation in which nonlinear mappings for block encryption, which have high cryptographic strength can be provided at great speed and efficiency. In general, two disjoint mappings of some common block size are selected and combined very rapidly into a single mapping of a large block size. The two disjoint mappings may be generated off-line and stored in memory prior to use. The fast combination of the two mappings may be provided in a great variety of ways, and may be controlled by a cryptographic key, thus ensuring increased cryptographic strength.

In one embodiment, the two disjoint mappings are orthomorphic mappings. Orthomorphisms provide a source of encryption tables which provide high cryptographic strength and uniqueness. Restricting the definition to mappings of n-bit binary numbers, $Z_2^n$, if $\psi(x)$ is a 1 to 1 (bijective) mapping on $Z_2^n$, and $f(x)=\psi(x)\oplus x$ is also a bijective mapping, then $f(x)$ is an orthomorphism. This is also known in the literature as a complete mapping. The symbol "$\oplus$" means bit-wise addition modulo 2. These mappings are of interest because:

1. There is a sound mathematical basis underlying orthomorphisms.
2. They exist in large numbers and can be generated deterministically by proprietary methods.
3. Despite their abundance, they are relatively quite rare when considered as part of the totality of bijective mappings on $Z_2^n$ namely, $2^n!$. This translates into 256! for mappings of 8-bit numbers. Thus, orthomorphisms are most unlikely to be found by a random search.
4. Maximal linear orthomorphisms form transitive permutation groups which is equivalent to having a set of non-overlapping substitution tables. It is possible to shift quickly from one table to another, so that, if desired, every successive clear text block can be encrypted by a different table from that used by its predecessor. This is a nonlinear use of a linear device.

Orthomorphisms, linear or nonlinear, turn out to have a unique and important property from information theory. The n-bit numbers, $Z_2^n$, comprise an algebraic group with $2^n-1$ maximal subgroups, each of order $2^{n-1}$. These include such familiar subgroups as the even numbers, the numbers which all have zero in the same bit position, and many more which are not characterized so simply. When using an orthomorphic mapping for encryption, if an encrypted block belongs to a particular maximal subgroup or complement thereof, the probability that the corresponding clear text block came from the same maximal subgroup or complement is always ½. This means that no information can be obtained about the clear text block from the cipher text block. This property is called perfect balance and occurs if and only if the cryptographic mapping is an orthomorphism. For example, if n=8, there are 510 such maximal subgroups and complements which have this perfect balance property.

The methods described herein, in relation to the present invention of providing high speed table generation for block encryption, of generating nonlinear mappings and nonlinear orthomorphisms for block encryption, may readily be carried out with a microprocessor-based system under program control. Alternatively, the high speed tables could readily be preprogrammed in read only memory used essentially as look-up tables. Moreover, hardware may be developed in which the techniques of the present invention may be implemented.

II. HIGH SPEED TABLE GENERATION

In general, two disjoint mappings of some common block size are selected and combined very rapidly into a single mapping of a large block size. The two disjoint mappings may be generated off-line and stored in memory prior to use.

A. SELECTION OF TWO DISJOINT MAPPINGS

The first table comprises a set of distinct $2^n$ n-bit input numbers $X_i$ (where $i=0, 1, \ldots, m$, $m=2^n-1$ and n is an integer) and a first set of distinct $2^n$ n-bit output numbers, where the first set of $2^n$ n-bit output numbers being a one-to-one mapping of the set of $2^n$ n-bit input numbers. For example, each number $X_i$ is mapped by a first function f to obtain the first set of $2^n$ n-bit output numbers $f(X_i)$.

The second table comprises the set of distinct $2^n$ n-bit input numbers and a second set of distinct $2^n$ n-bit output numbers, where the second set of $2^n$ n-bit output numbers being a one-to-one mapping of the set of $2^n$ n-bit input numbers. For example, each number $X_i$ is mapped by a second function g to obtain the second set of $2^n$ n-bit output numbers $g(X_i)$. The second mapping of $2^n$ n-bit output numbers is disjoint from the first mapping of $2^n$ n-bit output numbers. That is, $f(X_i) \neq g(X_i)$.

B. SHUFFLING

FIG. 2 illustrates one embodiment of the shuffling process of the present invention. In particular, the first table ("table I") includes the following sets of input and output numbers:

| | | |
|---|---|---|
| $X_0$ | $\rightarrow$ | $f(X_0)$ |
| $X_1$ | $\rightarrow$ | $f(X_1)$ |
| . | | . |
| . | | . |
| $X_k$ | $\rightarrow$ | $f(X_k)$ |
| . | | . |
| . | | . |
| $X_m$ | $\rightarrow$ | $f(X_m)$ |

The second table ("table II") includes the following sets of input and output numbers:

| | | |
|---|---|---|
| $X_0$ | → | $g(X_0)$ |
| $X_1$ | → | $g(X_1)$ |
| . | | . |
| . | | . |
| . | | . |
| $X_k$ | → | $g(X_k)$ |
| . | | . |
| . | | . |
| . | | . |
| $X_m$ | → | $g(X_m)$. |

The first and the second tables are then shuffled or combined to provide a third table having $2^n$ pairs of n-bit input numbers and $2^n$ pairs of n-bit output numbers. The third table has a predetermined order in which identical input numbers are arranged in pairs and identical output numbers are arranged in pairs.

Figure 3:
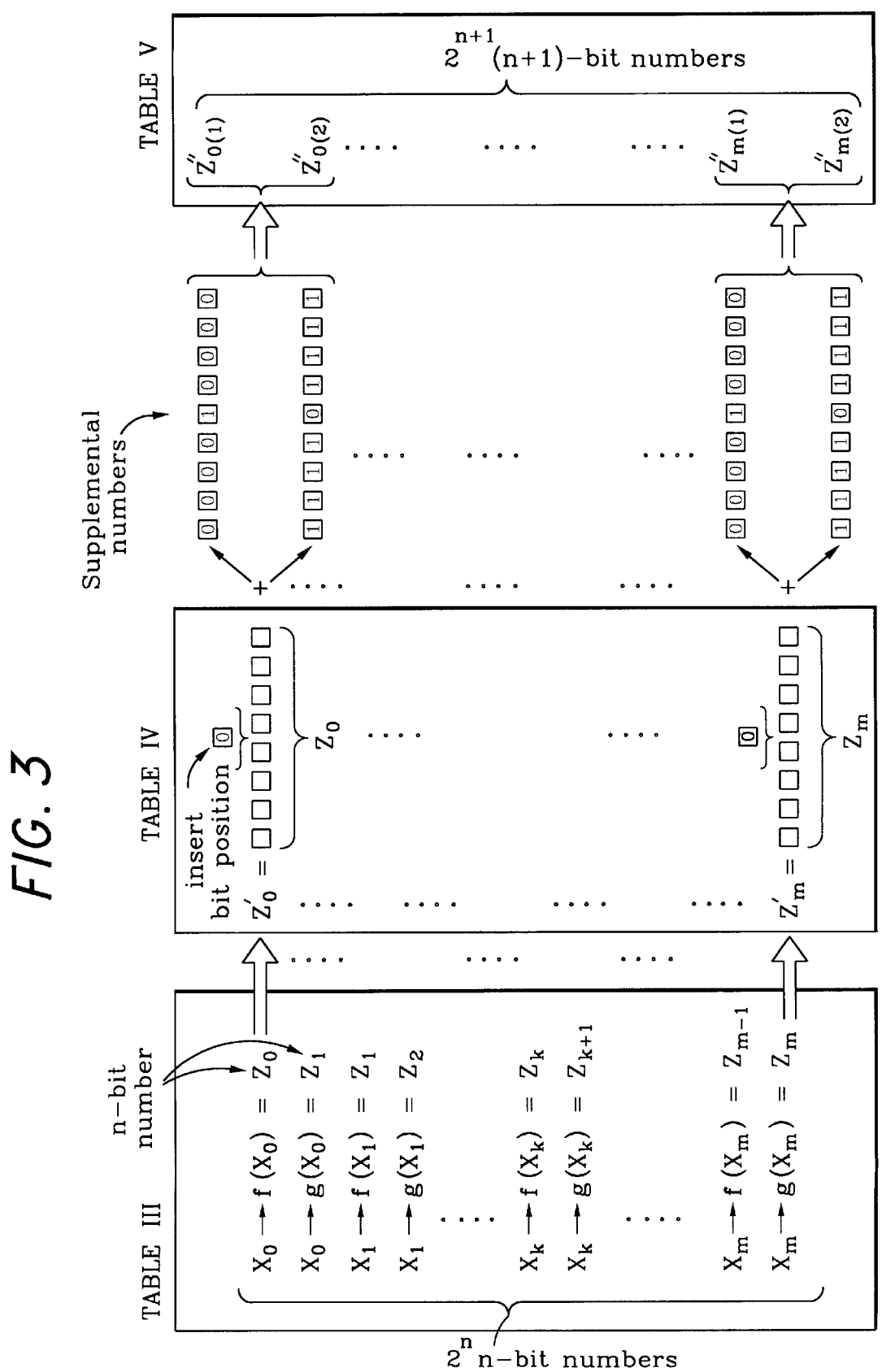
FIG. 3 illustrates one embodiment of the conversion process of the present invention.

In particular, Table I and Table II are combined as shown in FIG. 3, to obtain a third table ("table III") which is ordered as follows:

| | | |
|---|---|---|
| $X_0$ | $Z_0$ | (from table I) |
| $X_0$ | $Z_1$ | (from table II) |
| $X_1$ | $Z_1$ | (from table I) |
| $X_1$ | $Z_2$ | (from table II) |
| . | . | |
| . | . | |
| . | . | |
| $X_{k-1}$ | $Z_k$ | (from table II) |
| $X_k$ | $Z_k$ | (from table I) |
| $X_k$ | $Z_0$ | (from table II) |

The process of shuffling to obtain a third table ("table III") may be represented and described as follows:

| | | | |
|---|---|---|---|
| $X_0$ | ← | $Z_0$ | (from table I) |
| ↓ | | | |
| $X_0$ | → | $Z_1$ | (from table II) |
| | | ↓ | |
| $X_1$ | ← | $Z_1$ | (from table I) |
| ↓ | | | |
| $X_1$ | → | $Z_2$ | (from table II) |
| . | | . | |
| . | | . | |
| . | | . | |
| $X_i$ | ← | $Z_i$ | (from table I) |
| ↓ | | | |
| $X_i$ | → | $Z_{i+1}$ | (from table II) |
| . | | . | |
| . | | . | |
| . | | . | |
| $X_{k-1}$ | → | $Z_k$ | (from table II) |
| | | ↓ | |
| $X_k$ | ← | $Z_k$ | (from table I) |
| ↓ | | | |
| $X_k$ | → | $Z_0$ | (from table II). |

First, an n-bit output number $Z_0$ is selected from table I and its corresponding n-bit input number from table I is designated as $X_0$, where $f(X_0)=Z_0$. Next, the same n-bit input number $X_0$ is selected from table II and its corresponding n-bit output number from table II, i.e., $g(X_0)$ is designated as $Z_1$. This process continues for k=1 to m, where $m=2^{n-1}$. When k=m, the process of shuffling terminates.

In general, the combining or shuffling process may be described as follows:

(1) selecting an n-bit output number $Z_i$ from table I and designating a corresponding n-bit input number from table I as $X_i$, where $f(X_i)=Z_i$;

(2) selecting the n-bit input number $X_i$ of step (1) from table II and designating a corresponding n-bit output number from table II $g(X_i)$ as $Z_{i+1}$;

(3) performing steps (1) through (2) for i=0 to k, where $k=2^n-1$, until $Z_0=f(X_k)$ reappears a second time.

(4) determine if k=m or if all m pairs of numbers have been used;

(5) if so, terminating the combining step.

(6) if k<m;

(7) continue the combining step by selecting a previously unused n-bit output number $Z_{k+1}$ from table I and designating a corresponding input number from table I as $X_{k+1}$;

(8) selecting the input number $X_{k+1}$ as provided in step (7) from table II and designating a corresponding output number from table II as $Z_{k+2}$, where $g(X_{k+1})=Z_{k+2}$;

(9) selecting the output number $Z_{k+2}$ as provided in step (8) from table I and designating a corresponding input number from table I as $X_{k+2}$;

(10) selecting the input number $X_{k+2}$ as provided in step (9) from table II and designating a corresponding output number from table II as $Z_{k+3}$, where $g(X_{k+2})=Z_{k+3}$; and

(11) repeating steps (6) to (10) until $Z_{k+1}$ reappears a second time;

(12) determining if all m pairs of input and output numbers have been used;

(13) if so, terminating the combining step.

(14) if all m pairs of input and output numbers have not been used, continuing with the combining process until all m pairs of input and output numbers have been used.

The resulting Table III may be expressed as follows:

| | | |
|---|---|---|
| $X_0$ | $Z_0$ | (from table I) |
| $X_0$ | $Z_1$ | (from table II) |
| $X_1$ | $Z_1$ | (from table I) |
| $X_1$ | $Z_2$ | (from table II) |
| . | . | |
| . | . | |
| . | . | |
| $X_i$ | $Z_i$ | (from table I) |
| $X_i$ | $Z_{i+1}$ | (from table II) |
| . | . | |
| . | . | |
| . | . | |
| $X_{k-1}$ | $Z_k$ | (from table II) |
| $X_k$ | $Z_k$ | (from table I) |
| $X_k$ | $Z_0$ | (from table II). |

C. TRANSFORMING THE SHUFFLED PAIR OF MAPPINGS INTO A SINGLE MAPPING

Next, each of the $2^n$ pairs of n-bit input numbers and each of the $2^n$ pairs of n-bit output numbers in table III are converted to (n+1)-bit numbers by inserting a bit position containing a zero to each of the $2^n$ pairs of n-bit input numbers and each of the $2^n$ pairs of n-bit output numbers. FIG. 3 illustrates one embodiment of the conversion process of the present invention. A supplemental (n+1)-bit number containing a one in the same bit position and a zero in the remaining n bit positions is also generated.

The supplemental (n+1)-bit number is added to one of each pair of the $2^n$ pairs of (n+1)-bit input numbers and to one of each pair of the $2^n$ pairs of (n+1)-bit output numbers to obtain a resulting table comprising a set of distinct $2^{n+1}$ (n+1)-bit input numbers and a set of distinct $2^{n+1}$ (n+1)-bit output numbers.

At this point, generation of the encryption table is completed. Clear text (n+1)-bit data may be encrypted by providing the (n+1)-bit clear text data as inputs to the encryption table to obtain cipher text (n+1)-bit numbers as outputs.

III. GENERATING THE ORTHOMORPHIC MAPPINGS

A. REPRESENTATION OF ORTHOMORPHISMS

The n-bit binary numbers form the well known algebraic group $Z_2^n$ where the group operation "$\oplus$" is bit-wise addition modulo 2, also known as XOR-ing. An orthomorphism can be represented by a set of $2^n$ equations, as follows.

In this example n=8:

TABLE A

| | | | | |
|---|---|---|---|---|
| $X_0$ | $\oplus$ | $X_0$ | = | $\oplus$ |
| $X_{255}$ | $\oplus$ | $X_1$ | = | $Z_1$ |
| $X_1$ | $\oplus$ | $X_2$ | = | $Z_2$ |
| . | . | . | . | . |
| . | . | . | . | . |
| . | . | . | . | . |
| $X_{i-1}$ | $\oplus$ | $X_i$ | = | $Z_i$ |
| . | . | . | . | . |
| . | . | . | . | . |
| . | . | . | . | . |
| $X_{254}$ | $\oplus$ | $X_{255}$ | = | $Z_{255}$ |

The middle column defines a permutation of $Z_2^n$ from which each number, except $X_0$ is added to its successor to obtain the numbers in the right column. The left column represents the same permutation but rotated by one position. The left column comprises the clear text data which is encrypted by adding each block to its successor in the permutation (its companion in the middle column) to obtain the corresponding cipher text block in the right column. $X_0$ is a fixed point of the orthomorphic permutation (but not of the mapping). The orthomorphic permutation may have some subcycles but no other fixed points. The fixed point of the mapping is that number in the left column whose successor in the orthomorphic permutation (companion in the middle column) is 0.

For what follows, it is convenient to have an alternate representation of the orthomorphisms of binary numbers. $Z_2^n$ is not only an algebraic group but it is also a linear vector space. All of the n-bit numbers can be represented in terms of a complete linearly independent set, that is, a set of n vectors (binary numbers) for which no member of the set can be expressed as a linear combination of the others.

Let $\{B_1, B_2, \ldots B_n\}$ be a complete linearly independent set of n-bit binary numbers. Any n-bit number can be written: $X = a_1 B_1 \oplus \ldots \oplus a_n B_n$ where $a_i = 0$ or 1 and "$\oplus$" means bit-wise addition modulo 2.

For small n, one can use A, B, C, D (n=4), or A, B, C, D, E, F, G, H (n=8) to represent the complete linearly independent set and omit the addition symbol, e.g.:

A$\oplus$C$\oplus$E≡ACE

As one rarely uses n>26, this notation is convenient.

As an example for n=3, let A=1 0 1, B=0 1 1, C=1 1 1

| | | |
|---|---|---|
| 0 0 0 | = | θ |
| 0 0 1 | = | ABC |
| 0 1 0 | = | AC |
| 0 1 1 | = | B |
| 1 0 0 | = | BC |
| 1 0 1 | = | A |
| 1 1 0 | = | AB |
| 1 1 1 | = | C |

As a further example, a linear orthomorphism can be written in two equivalent ways, as follows:

| Row Number n = 4 | | | | $X_k = X_{k-4} \oplus X_{k-1}$ | | | |
|---|---|---|---|---|---|---|---|
| 0 | θ $\oplus$ | θ = | θ | θ | $\oplus$ θ | = θ |
| 1 | CD $\oplus$ | A = | ACD | $X_{15}$ | $\oplus X_1$ | = $X_{12}$ |
| 2 | A $\oplus$ | B = | AB | $X_1$ | $\oplus X_2$ | = $X_{13}$ |
| 3 | B $\oplus$ | C = | BC | $X_2$ | $\oplus X_3$ | = $X_{14}$ |
| 4 | C $\oplus$ | D = | CD | $X_3$ | $\oplus X_4$ | = $X_{15}$ |
| 5 | D $\oplus$ | AD = | A | $X_4$ | $\oplus X_5$ | = $X_1$ |
| 6 | AD $\oplus$ | ABD = | B | $X_5$ | $\oplus X_6$ | = $X_2$ |
| 7 | ABD $\oplus$ | ABCD = | C | $X_6$ | $\oplus X_7$ | = $X_3$ |
| 8 | ABCD $\oplus$ | ABC = | D | $X_7$ | $\oplus X_8$ | = $X_4$ |
| 9 | ABC $\oplus$ | BCD = | AD | $X_8$ | $\oplus X_9$ | = $X_5$ |
| 10 | BCD $\oplus$ | AC = | ABD | $X_9$ | $\oplus X_{10}$ | = $X_6$ |
| 11 | AC $\oplus$ | BD = | ABCD | $X_{10}$ | $\oplus X_{11}$ | = $X_7$ |
| 12 | BD $\oplus$ | ACD = | ABC | $X_{11}$ | $\oplus X_{12}$ | = $X_8$ |
| 13 | ACD $\oplus$ | AB = | BCD | $X_{12}$ | $\oplus X_{13}$ | = $X_9$ |
| 14 | AB $\oplus$ | BC = | AC | $X_{13}$ | $\oplus X_{14}$ | = $X_{10}$ |
| 15 | BC $\oplus$ | CD = | BD | $X_{14}$ | $\oplus X_{15}$ | = $X_{11}$ |

The binary numbers in each representation can be clearly identified from row. 1, CD=$X_{15}$, A=$X_1$, and ACD=$X_{12}$ etc. A, B, C, and D can be any linearly independent set of 4-bit binary numbers. Of course, this representation holds as well for an affine or nonlinear orthomorphism. In those cases, the right column no longer is a rotated version of the permutation represented by the middle column.

B. SHUFFLING

Shuffling is the process of generating orthomorphisms in $Z_2^{n+1}$ from pairs in $Z_2^n$.

A pair of disjoint orthomorphic mappings of n-bit numbers will have the property that $f(x) \neq g(x)$ for all clear text numbers x, where f and g are the first and second orthomorphic mappings respectively. Further for any cipher text number z there are clear text numbers $u \neq v$ such that $f(u) = g(v) = z$. Thus, for each cipher text $Z_i$ we can find a pair of equations from the first and second orthomorphic mappings as follows:

| | | | | | |
|---|---|---|---|---|---|
| $U_{i-1}$ | $\oplus$ | $U_i$ | = | $Z_i$ | first |
| $V_{i-1}$ | $\oplus$ | $V_i$ | = | $Z_i$ | second |

Each of these five numbers can be expressed as a linear combination of n-bit numbers from a complete linearly independent set. To change to an orthomorphic mapping on $Z_2^{n+1}$, one must first change the linearly independent set of n-bit numbers to (n+1)-bit numbers. For example, as in Section IV, for n=3, let A=101, B=011, C=111. We can add 0 0 0 0 to each, to obtain A'=0101, B'=0011, C'=01 11, This is an independent set in $Z_2^4$, but we need a fourth number D' which is independent of A', B', C' to obtain a complete linearly independent set. D'=1000 would meet this requirement, as would other choices. Symbolically, we retain the original literal representation and supplement it with an additional term.

Extending this example, if the corresponding equations for n=4 are:

| ABCD | ⊕ | C   | = | ABD | first  |
|------|---|-----|---|-----|--------|
| BC   | ⊕ | ACD | = | ABD | second |

We let A, B, C, and D now represent independent 5-bit numbers and supplement these with a fifth independent number E. The above pair of equations can now be modified to be consistent equations in an orthomorphism of the 5-bit numbers.

For example:

| ABCDE | ⊕ | C    | = | ABDE | first  |
|-------|---|------|---|------|--------|
| BCE   | ⊕ | ACDE | = | ABD  | second |

This could be done in several other ways. For example:

|    | ABCD  | ⊕ | CE  | = | ABDE | first  |
|----|-------|---|-----|---|------|--------|
|    | BC    | ⊕ | ACD | = | ABD  | second |
| or |       |   |     |   |      |        |
|    | ABCDE | ⊕ | CE  | = | ABD  | first  |
|    | BCE   | ⊕ | ACD | = | ABDE | second |

However, there are two essentials, E must be assigned consistently, and one but only one of the $Z_i$=ABD terms must be modified.

IV. DETAILED PROCEDURES AND ANALYSIS (a) The next procedure is to take the two orthomorphic mappings on $Z_2^n$ each of which is represented by a set of $2^n$ equations, and shuffle them together, without any modifications, in such a way that subsequent modifications can be done deterministically as controlled by the key. We will designate the two original orthomorphisms, respectively as (I) and (II). For convenience, we will also redesignate the row numbers. The numbers in the left (L), middle (M), and right (R) columns will be respectively designated by the symbols $X_i$, $Y_j$, $Z_{ij}$. The corresponding designation of the original orthomorphism, (I) or (II), will be written to the right of each unmodified equation. In the combined set of shuffled equations each number $Z_2^n$ will appear twice each in the L, M, and R columns.

First Step: Take an arbitrary equation from (I) and designate it as follows:

$$X_0 \oplus Y_0 = Z_{0,0} \quad \text{(I)}$$

Second Step: Follow this with the equation from (II) which also has $X_0$ in column L:

$$X_0 \oplus Y_0 = Z_{0,0} \quad \text{(I)}$$
$$X_0 \oplus Y_1 = Z_{0,1} \quad \text{(II)}$$

Since the equations are from disjoint orthomorphisms, $Y_0 \neq Y_1$ and $Z_{0,0} \neq Z_{0,1}$ Third Step: Follow this with the equation from (I) which also has $Y_1$ in column M:

$$X_1 \oplus Y_1 = Z_{1,1} \quad \text{(I)}$$
$$X_0 \oplus Y_1 = Z_{0,1} \quad \text{(II)}$$
$$X_1 \oplus Y_1 = Z_{1,1} \quad \text{(I)}$$

Subsequent Steps: Continue this alternating process between columns L and M, and between (I) and (II) until $Y_0$ appears a second time in column M. The pattern is as follows:

| $X_0$ | ⊕ | $Y_0$ | = | $Z_{0,0}$ | (I) |
| $X_0$ | ⊕ | $Y_1$ | = | $Z_{0,1}$ | (II) |
| $X_1$ | ⊕ | $Y_1$ | = | $Z_{1,1}$ | (I) |
| $X_1$ | ⊕ | $Y_2$ | = | $Z_{1,2}$ | (II) |
| . | | | | | |
| . | | | | | |
| $X_i$ | ⊕ | $Y_i$ | = | $Z_{i,i}$ | (I) |
| $X_i$ | ⊕ | $Y_{i+1}$ | = | $Z_{i,i+1}$ | (II) |
| $X_{i+1}$ | ⊕ | $Y_{i+1}$ | = | $Z_{i+1,i+1}$ | (I) |
| . | | | | | |
| . | | | | | |
| $X_k$ | ⊕ | $Y_k$ | = | $Z_{k,k}$ | (I) |
| $X_k$ | ⊕ | $Y_0$ | = | $Z_{k,k+1}$ | (II) |

If $k=2^n-1$, the shuffling is complete. If not, we have completed a cycle of 2(k+1) equations. We choose any hitherto unused equation from (I) and resume the process with another cycle as follows:

| $X_{k+1}$ | ⊕ | $Y_{k+1}$ | = | $Z_{k+1,k+1}$ | (I) |
| $X_{k+1}$ | ⊕ | $Y_{k+2}$ | = | $Z_{k+1,k+2}$ | (II) |
| . | | | | | |
| . | | | | | |
| Xl | ⊕ | $Y_l$ | = | $Z_{l,l}$ | (I) |
| Xl | ⊕ | $Y_{k+1}$ | = | $Z_{l,l+1}$ | (II) |

This process continues until all $2^{n+1}$ equations have been used.

If there are multiple cycles, in each, $X_i$ and $Y_i$ will each appear twice, consecutively, or not at all. $Z_{i,i} \neq Z_{i,i+1}$ and $Z_{i,i+1} \neq Z_{i+1,i+1}$ for all i since a pair of equations cannot have two corresponding numbers the same and the third ones different. In a single cycle which is not the whole set of $2^{n+1}$ equations, a given Z appearing in column R may also appear a second time or its second appearance may occur in a preceding or subsequent cycle. The shuffling is now complete and has consisted only of a reordering of the $2^{n+1}$ equations without modifications.

(b) The second procedure is to transform the shuffled pair of orthomorphic mappings on $Z_2^n$ to a single orthomorphic mapping on $Z_2^{n+1}$. The first step is to add the extra (n+1)-bit number E=1 0 0 0 ... 0 0 (1 followed by n zeros) to one or the other of the two identical numbers Z in column R. There are $2^n$ such pairs. If E is not added to a particular Z, then O=0 0 0 . . 0 0 (n+1 zeroes) is added to it. This is done by proceeding consecutively down column R. For the first equation, add E or O to $Z_0$ accordingly as the key bit is 1 or 0:

$$X_0 \oplus Y_0 = Z_{0,0}E$$

or $$X_0 \oplus Y_0 = Z_{0,0}O$$

The equation, of course, is momentarily unbalanced. Whatever choice is made, $Z_{0,0}$ will appear a second time further down in column R. The opposite selection of E or O must be made for the second appearance. This latter selection is deterministic. Continuing down column R, for each $Z_{i,i}$ or $Z_{i,i+1}$, if this is the first appearance, add E or O as determined by the key. If this is the second appearance, the choice has already been determined. If there is only one cycle proceed in this way until all $2^n$ placements of E have been completed. If there are multiple cycles, there is one constraint in each except in the last cycle. The numbers of E's (and O's) assigned in column R in each cycle must be even. The reason for this is explained below. When using the key to assign E's to Z's in each cycle, one eventually comes to the last Z in column R which occurs only once in that cycle and which did not appear in a previous cycle. In this case, E or O must be assigned such that the total number of E's in column R in that cycle is even. In the final cycle, this balance occurs automatically. An alternative way of meeting this requirement, is to arbitrarily assign E's and O's in each cycle as the key dictates, only avoiding duplications. When assignments are completed in that cycle, one counts E's to see if the number is even. If the number of E's is odd, one selects a Z which only occurred once in that cycle and did not appear in a previous cycle, and then reverses its E/0 assignment. The most efficient way to do this is to start with the smallest cycle in assigning the E's and O's in column R, and then proceed to successively larger ones. This avoids the situation in which the selection in a large cycle may completely determine that in a smaller cycle. In this latter case, one must simultaneously monitor the secondary or consequential assignments of E's and O's in the smaller cycle to avoid assignment of an odd number of E's.

The second step in his procedure is to assign E's and O's to columns L and M to complete the transformation to an orthomorphism on $Z_2^{n+1}$. Consider the first equation in the first cycle. $Z_{0,0}$ has been modified one of two ways in the first procedure as specified by the key. For each of these two ways there is now a further choice of two ways by which to complete the transformation:

CASE 1:

|  | $X_0$ | $\oplus$ | $Y_0$ | = | $Z_{0,0}E$ | (I) |
|---|---|---|---|---|---|---|
| becomes | $X_0E$ | $\oplus$ | $Y_0O$ | = | $Z_{0,0}E$ |  |
| or | $X_0O$ | $\oplus$ | $Y_0E$ | = | $Z_{0,0}E$ |  |

CASE 2:

|  | $X_0$ | $\oplus$ | $Y_0$ | = | $Z_{0,0}O$ | (I) |
|---|---|---|---|---|---|---|
| becomes | $X_0E$ | $\oplus$ | $Y_0E$ | = | $Z_{0,0}O$ |  |
| or | $X_0O$ | $\oplus$ | $Y_0O$ | = | $Z_{0,0}O$ |  |

This choice can be made by the key. From the next equation to the end of the cycle, no further choices can be made, as the remainder of the process of assigning E's and O's is deterministic and free of conflicts.

Example 1:

$$X_0E \oplus Y_0O = Z_{0,0}E$$
$$X_0O \oplus Y_1E = Z_{0,1}E$$
$$X_1O \oplus Y_1O = Z_{1,1}O$$
$$X_1E \oplus Y_2O = Z_{1,2}E$$
$$X_2O \oplus Y_2E = Z_{2,2}E$$
$$X_2E \oplus Y_3E = Z_{2,3}O$$
$$\vdots$$

Example 2:

$$X_0O \oplus Y_0O = Z_{0,0}O$$
$$X_0E \oplus Y_1O = Z_{0,1}E$$
$$X_1O \oplus Y_1E = Z_{1,1}E$$
$$X_1E \oplus Y_2E = Z_{1,2}O$$
$$X_2E \oplus Y_2O = Z_{2,2}E$$
$$X_2O \oplus Y_3E = Z_{2,3}E$$

In each example, having made a decision in the first equation and in all of column R, $X_0$ in the second equation must be the opposite of its counterpart in the first. This in turn determines what to add to $Y_1$ also in the second equation. This determines $Y_1$ in equation 3 which then determines $X_1$ in equation 3, thence to $Y_2$ in equation 4, etc. This can be shown schematically:

$$X_0 \xleftarrow{\oplus} Y_0 = Z_{0,0}$$
$$\downarrow$$
$$X_0 \xrightarrow{\oplus} Y_1 = Z_{0,1}$$
$$\downarrow$$
$$X_1 \xleftarrow{\oplus} Y_1 = Z_{1,1}$$
$$\downarrow$$
$$X_1 \xrightarrow{\oplus} Y_2 = Z_{1,2}$$
$$\downarrow$$
$$X_2 \xleftarrow{\oplus} Y_2 = Z_{2,2}$$
$$\downarrow$$
$$X_2 \xrightarrow{\oplus} Y_3 = Z_{2,3}$$
$$\downarrow$$
$$\vdots$$
$$X_i \xleftarrow{\oplus} Y_i = Z_{i,i}$$
$$\downarrow$$
$$X_i \xrightarrow{\oplus} Y_{i+1} = Z_{i,i+1}$$
$$\downarrow$$
$$X_{i+1} \xleftarrow{\oplus} Y_{i+1} = Z_{i+1,i+1}$$
$$\downarrow$$
$$\vdots$$

(c) If there is a single cycle, the number of E's is even in each column. We now need to justify the general statement that in each cycle the number of E's in column R is even. Each cycle will contain 2k equations or rows because of the way in which they are constructed. k may be even or odd. In columns L and M there will be k E's each since the numbers $X_1$ and $Y_1$ occur in pairs. Thus the number of E's in columns L and M may be even or odd but the totality in both columns, 2k is even. There will be some number J of E's in column R. In each modified equation there will be either two E's or no E's. Thus the total number of E's occurring in the cycle is even. Since 2k+J is even, J is also even.

Lastly, if there is a single cycle in the shuffled set of equations, there are $2^n$ pairs of equations sharing a common value in column R and $2^{2^n}$ ways of assigning E's and O's. Since there is a single cycle, there is one initial equation in which there are two choices of how to assign E's and O's in columns L and M. There is a total of $2^{2^n} \cdot 2 = 2^{2^n+1}$ key controlled choices.

Next we consider the case of multiple cycles. If there are two cycles, in the first cycle some number a entries occur twice and b entries occur once in column R in that cycle for a total of 2a+b equations. b will be an even number. a may be even or odd, but an E will be assigned to each of the a numbers in one or the other of the 2a rows as determined by the key. The assignment of E's to the b single numbers is also controlled by the key but with one constraint. The number of E's assigned to the b single numbers must be even or odd accordingly as a is even or odd, so that the total of E's assigned is even. Thus there will be no choice for the last of the b single numbers. An E must be added or omitted as necessary to assure that the total number of E's is even. Thus $2^a 2^{b-1} = 2^{a+b-1}$ key controlled choices will have been made in cycle 1. Next in cycle 2 there are c entries occurring twice and b entries occurring once. The assignment of E's to the b entries was determined in cycle I. There are $2^c$ choices for assignment of E's to the pairs. The numbers of E's in cycle 2 will automatically be even since they were in cycle 1. As in the single cycle case, there will be a choice of how to assign E to the L and M columns in the initial equation chosen in each cycle. For the two cycles, this is $2^2$ choices. The total number of choices is:

$$2^a 2^{b-1} 2^c 2^2 = 2^{2^n-1+2} = 2^{2^n+1}$$

since a+B+C=$2^n$

Now consider the general case where there are k cycles. Order them in increasing size from 1 to k, and let $a_i$ be the number of entries occurring twice in the R column of cycle i. Let $b_i$ be the number of single entries in column R, cycle i which have not appeared in any of the preceding cycles, i.e., $b_i \cap b_j = \emptyset$ for j<i. Then in cycle i the number of choices for assignment of E's in column R is $2^{a_i} 2^{b_i-1}$ since the final choices constrained to have an even number of E's in the R column. In cycle k, $b_k = 0$ since all of the single numbers in that last cycle will have occurred before. Thus the number of choices in that cycle is $2^{a_k} 2^{b_k} = 2^{a_k}$. Once again, in each cycle there is a single choice of how to assign E to the L or M column in the initial equation chosen. Thus the total number of choices is:

$$\left(\prod_{i=1}^{k} 2^{a_i}\right)\left(\prod_{i=1}^{k-1} 2^{b_i-1}\right) 2^k = 2^{2^n+1}$$

since $$\sum_{i=1}^{k} (a_i + b_i) = \sum_{i=1}^{k} a_i + \sum_{i=1}^{k-1} b_i + b_k = 2^n$$

The methods described in relation to the present invention of providing high speed table generation for block encryption, of generating nonlinear mappings and nonlinear orthomorphisms for block encryption, may readily be carried out with a microprocessor-based system under program control. Alternatively, memory could readily be preprogrammed in read only memory used essentially as look-up tables.

V. APPLICATION TO GENERAL CASES

Combining the two mappings on $Z_2^n$ into a single such mapping on $Z_2^{n+1}$ can be modified and simplified if the constraint that the composite mapping be an orthomorphism is removed. With reference to Table A, the numbers in the left column $X_{i-1}$ (clear text) are mapped onto the numbers in the right column $Z_i$ (cipher text). Thus, $f(X_{i-1})=Z_i$. The mapping in the middle column is equal to the sum $X_{i-1} \oplus f(X_i)$.

As described earlier, an orthomorphism is characterized by the fact that the numbers in the middle column are distinct. Each number in $Z_2^n$ occurs exactly once. In other mappings, some numbers will appear more than once and others not all. Thus, without the constraint that the composite mapping be an orthomorphism, there is no need to consider the middle column, or equivalently, to consider the sum of the input and output.

The combined table is obtained by alternating between the left and right columns and the middle column is deleted. This is illustrated as follows:

| | | |
|---|---|---|
| $X_0$ | $Z_0$ | (from table I) |
| $X_0$ | $Z_1$ | (from table II) |
| $X_1$ | $Z_1$ | (from table I) |
| $X_1$ | $Z_2$ | (from table II) |
| . | . | |
| . | . | |
| . | . | |
| $X_{k-1}$ | $Z_k$ | (from table II) |
| $X_k$ | $Z_k$ | (from table I) |
| $X_k$ | $Z_0$ | (from table II) |

If k=$2^n$-1, then the shuffling is complete. If not, a cycle of 2(k+1) equations has been obtained. As before, any previously unused equation from table I is used and the shuffling process is resumed until all of the $2^n$ pairs of equations have been used.

Also as described earlier, the n-bit numbers are converted to (n+1)-bit numbers by inserting another bit position containing a zero in each n-bit number. "E" may be considered an (n+1)-bit number with a 1 in that position where the remaining numbers have a 0, and an arbitrary set of 1's and 0's in the other bit positions.

Finally, an E is assigned to one of each $X_i$ pair. Since there is no middle column to consider, this can be performed in any fashion. There will be $2^n$ choices in each column for a total of $2^{n+1}$ choices.

VI. APPLICATIONS

Figure 4:
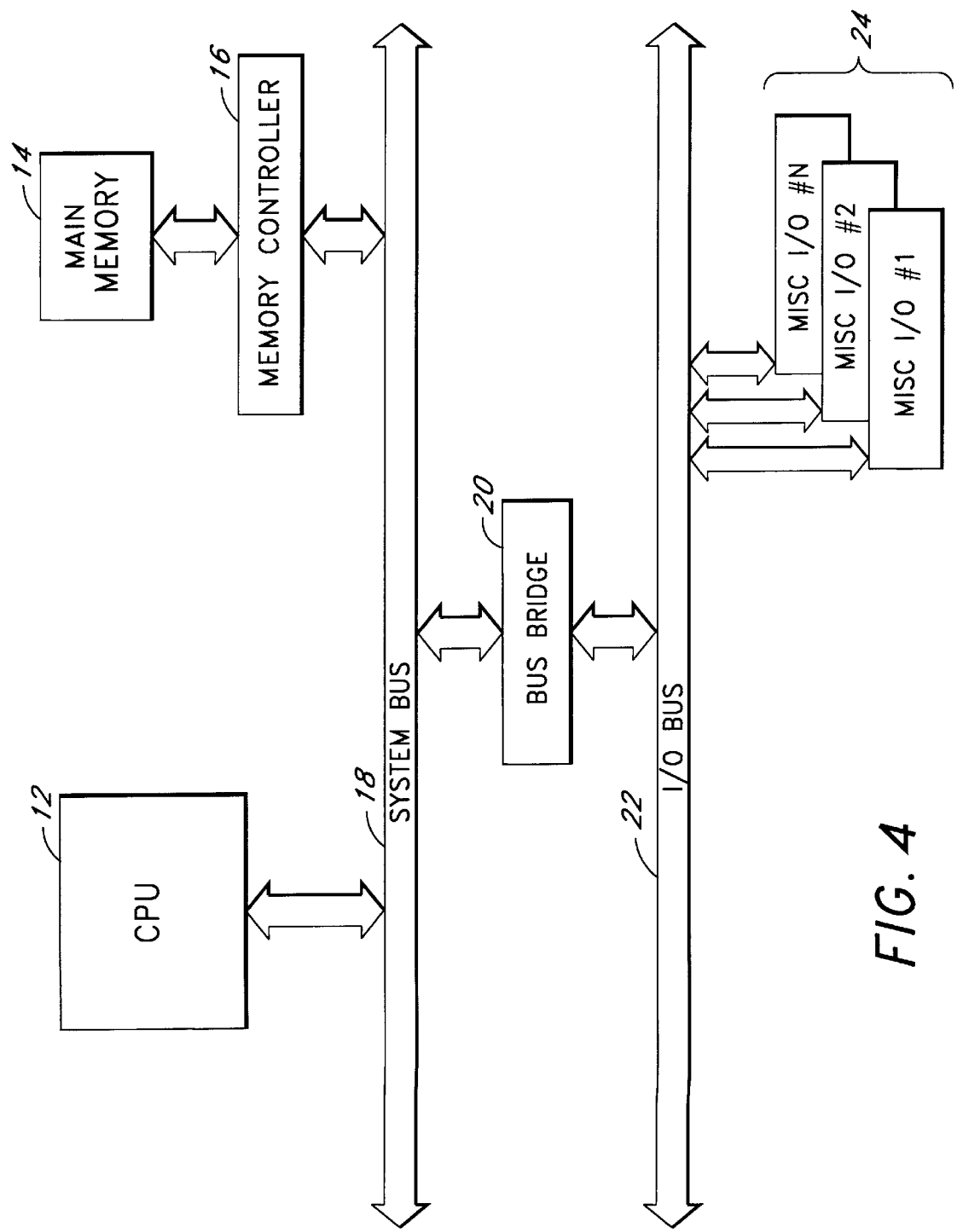
FIG. 4 illustrates one embodiment of a system block diagram of an exemplary processor system in which a method of the present invention may be performed.

The methods described in relation to the present invention may readily be carried out with a microprocessor-based system under program control. FIG. 4 is a system block diagram of an exemplary processor system in which the methods of the present invention may be performed. The processor system 10 shown in FIG. 4 comprises a central processing unit (CPU) 12 and main memory 14 which is coupled to and controlled by memory controller 16. The CPU 12 and memory controller 16 are coupled to a system bus 18. The processor system may also include various Input/Output ("I/O") and peripheral modules (i.e., MISC I/O #1, MISC I/O #2, . . . , MISC I/O #N) 24 which are coupled along an I/O bus 22. It should be understood however that further devices may be installed on the system bus 18 and on the I/O bus 22, as well known in the art. The bus bridge 20 provides an interface between the system bus 18 and the I/O bus 22. It is contemplated that the processor system 10, be any processor-based system.

In one embodiment, the tables obtained from disjoint mappings for example, tables I and II as described in the following section may be stored in main memory 14. The main memory 14 also stores instruction sequences which are executed by the CPU 12 to generate the resulting encryption table as described above. In an alternate embodiment, the nonlinear mapping process may be performed by the CPU 12 upon receipt of a set of $2^n$ n-bit input numbers to obtain a set of encryption tables.

In one embodiment, high quality nonlinear orthomorphisms on n-bit numbers can be generated off line and stored. The bar sinister method in particular produces very high quality ones but it may take several seconds for bit size n=8. It is also relatively easy to obtain disjoint pairs since the method involves finding transversals in Latin squares. There are two particular advantages to the shuffling method:

Firstly, (n+1)-bit S-box tables can be generated very rapidly for applications requiring high data rates and/or frequent fast table changing.

Secondly, the number of distinct (n+1)-bit tables that can be derived from a single pair of disjoint n-bit orthomorphisms is $2^{2^n+1}$. This means a key size of $2^n+1$ bits. In the most likely case of shuffling two orthomorphisms of the 7-bit numbers into one 8-bit nonlinear orthomorphism we would have a 129 bit key and $2^{129}=6.8 \times 10^{38}$ possible 8-bit orthomorphic tables.

In an alternate embodiment, the linear or nonlinear orthomorphic mapping process may be performed by the CPU 12 upon receipt of a set of $2^n$ n-bit input numbers to obtain a set of encryption tables.

Once the encryption table has been generated, it may be stored in main memory 14. Clear text (n+1)-bit data may then be encrypted by providing the (n+1)-bit clear text data as inputs to the encryption table to obtain cipher text (n+1)-bit numbers as outputs.

The present invention thus provides an apparatus and method for generating nonlinear mappings for block encryption, which has high cryptographic strength and which can be generated quickly and efficiently. In one embodiment, orthomorphisms for block encryption are used, which ensures increased cryptographic strength.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method of encryption to be performed by a computer, comprising the steps of:

(a) receiving a first table comprising a set of $2^n$ distinct n-bit input numbers and a first set of $2^n$ distinct n-bit output numbers, the first set of $2^n$, n-bit output numbers being a one-to-one mapping of the set of $2^n$, n-bit input numbers;

(b) receiving a second table comprising of the set of $2^n$ distinct n-bit input numbers and a second set of $2^n$ distinct n-bit output numbers, the second set of $2^n$, n-bit output numbers being a one-to-one mapping of the set of $2^n$, n-bit input numbers, the second mapping of $2^n$, n-bit output numbers being disjoint from the first mapping of $2^n$, n-bit output numbers;

(c) combining the first and the second tables to provide a third table having $2^n$ pairs of n-bit input numbers and $2^n$ pairs of n-bit output numbers, the third table having a predetermined order in which identical input numbers are arranged in pairs and identical output numbers are arranged in pairs;

(d) generating a fourth table of $2^n$ pairs of (n+1)-bit numbers by converting each of the $2^n$ pairs of n-bit input numbers and each of the $2^n$ pairs of n-bit output numbers in the third table, to (n+1)-bit numbers by inserting a bit position containing a zero in each of the $2^n$ pairs of n-bit input numbers and in each of the $2^n$ pairs of n-bit output numbers;

(e) generating a supplemental (n+1)-bit number containing a one in the same bit position and a zero in the remaining n-bit positions;

(f) adding the supplemental (n+1)-bit number to one of each pair of the $2^n$ pairs of (n+1)-bit input numbers and to one of each pair of the $2^n$ pairs of (n+1)-bit output numbers to obtain a fifth table comprising a set of $2^{n+1}$ distinct (n+1)-bit input numbers and a set of $2^{n+1}$ distinct (n+1)-bit output numbers, the set of $2^{n+1}$, (n+1)-bit output numbers being a one-to-one mapping of the $2^{n+1}$, (n+1)-bit input numbers; and (g) encrypting clear text data by providing (n+1)-bit clear text data as inputs to the fifth table to obtain the corresponding (n+1)-bit output number as a cipher text.

2. The method of claim 1, further comprising the step of:

representing each number in the set of $2^n$ n-bit input numbers by $X_i$, where i=0, . . . , m, m=$2^n$-1, n being an integer.

3. The method of claim 2, further comprising the steps of:

mapping each number $X_i$ in the set of $2^n$ n-bit input numbers by a first function f to obtain the first set of $2^n$ n-bit output numbers $f(X_i)$;

mapping each number $X_i$ in the set of $2^n$ n-bit input numbers by a second function g to obtain the second set of $2^n$ n-bit output numbers $g(X_i)$, where $f(X_i) \neq g(X_i)$.

4. The method of claim 3, wherein in the step of combining the first and second tables, the predetermined order of the third set is obtained by:

(c.1) designating the first table comprising the set of $2^n$ n-bit input numbers $X_i$ and the first set of $2^n$ n-bit output numbers $f(X_i)$, as table I and arranging table I as follows:

$X_0 \rightarrow f(X_0)$
$X_1 \rightarrow f(X_1)$
.
.
.
$X_k \rightarrow f(X_k)$
.
.
.
$X_m \rightarrow f(X_m)$ (c.2) designating the second table comprising the set of $2^n$ n-bit input numbers $X_i$ and the second set of $2^n$ n-bit output numbers $g(X_i)$, as table II and arranging table II as follows:

$X_0 \rightarrow g(X_0)$
$X_1 \rightarrow g(X_1)$
.
.
.

-continued $$X_k \rightarrow g(X_k)$$
.
.
.
$$X_m \rightarrow g(X_m).$$

5. The method of claim 4, wherein the step of combining comprises the steps of:

combining the first and the second tables by listing each $2^n$ n-bit input and output numbers in an order as follows:

| | | |
|---|---|---|
| $X_0$ | $f(X_0) = Z_0$ | (from table I) |
| $X_0$ | $g(X_0) = Z_1$ | (from table II) |
| $X_1$ | $f(X_1) = Z_1$ | (from table I) |
| $X_1$ | $g(X_1) = Z_2$ | (from table II) |
| . | . | |
| . | . | |
| . | . | |
| $X_i$ | $f(X_i) = Z_i$ | (from table I) |
| $X_i$ | $g(X_i) = Z_{i+1}$ | (from table II) |
| . | . | |
| . | . | |
| . | . | |
| $X_{k-1}$ | $g(X_k) = Z_k$ | (from table II) |
| $X_k$ | $f(X_k) = Z_k$ | (from table I) |
| $X_k$ | $g(X_0) = Z_0$ | (from table II). |

6. The method of claim 4, wherein the step of combining comprises the steps of:

(c.1) selecting an n-bit output number $Z_0$ from table I and designating a corresponding n-bit input number from table I as $X_0$, where $f(X_0)=Z_0$;

(c.2) obtaining the n-bit input number $X_0$ of step (c.1) from table II and designating a corresponding n-bit output number from table II, $g(X_0)$ as $Z_1$;

(c.3) continuing the step of combining by obtaining the n-bit output number $Z_i$ of the previous step from table I and designating a corresponding n-bit input number from table I as $X_i$, where $f(X_i)=Z_i$;

(c.4) obtaining the n-bit input number of the previous step from table II and designating a corresponding n-bit output number from table II, $g(X_i)$, as $Z_{i+1}$;

(c.5) performing steps (c.3) through (c.4) for i=1 to k, where $k=2^n-1$, until $Z_0=f(X_k)$ reappears a second time, (c.6) determining if k=m;

(c.7) if so, terminating the combining step.

7. The method of claim 6, wherein steps (c.1) through (c.5) may be represented as follows:

combining table I and table II by listing each $2^n$ n-bit input and output numbers in an order as follows:

| | | | |
|---|---|---|---|
| $X_0$ | $\leftarrow$ | $Z_0$ | (from table I) |
| $\downarrow$ | | | |
| $X_0$ | $\rightarrow$ | $Z_1$ | (from table II) |
| | | $\downarrow$ | |
| $X_1$ | $\leftarrow$ | $Z_1$ | (from table I) |
| $\downarrow$ | | | |
| $X_1$ | $\rightarrow$ | $Z_2$ | (from table II) |
| . | | . | |
| . | | . | |
| . | | . | |
| $X_i$ | $\leftarrow$ | $Z_i$ | (from table I) |
| $\downarrow$ | | | |
| $X_i$ | $\rightarrow$ | $Z_{i+1}$ | (from table II) |
| . | | . | |
| . | | . | |
| . | | . | |
| $X_{k+1}$ | $\rightarrow$ | $Z_k$ | (from table II) |
| | | $\downarrow$ | |
| $X_k$ | $\leftarrow$ | $Z_k$ | (from table I) |
| $\downarrow$ | | | |
| $X_k$ | $\rightarrow$ | $Z_0$ | (from table II). |

8. The method of claim 6, wherein the step of combining further comprises the steps of:

(c.8) if k<m;

(c.9) continuing the combining step by selecting a previously unused n-bit output number $Z_{k+1}$ from table I and designating a corresponding input number from table I as $X_{k+1}$;

(c.10) obtaining the input number $X_{k+1}$ as provided in step (c.9) from table II and designating a corresponding output number from table II as $Z_{k+2}$, where $g(X_{k+1})=Z_{k+2}$;

(c.11) obtaining the output number $Z_{k+2}$ as provided in step (c.10) from table I and designating a corresponding input number from table I as $X_{k+2}$;

(c.12) obtaining the input number $X_{k+2}$ as provided in step (c.11) from table II and designating a corresponding output number from table II as $Z_{k+3}$, where $g(X_{k+2})=Z_{k+3}$; and (c.13) repeating steps (c.8) to (c.12) until $Z_{k+1}$ reappears a second time;

(c.14) determining if all m pairs of input and output numbers have been used;

(c.15) if so, terminating the combining step.

9. The method of claim 8, further comprising the steps of:

(c.16) if all m pairs of input and output numbers have not been used, continuing with the combining process until all m pairs of input and output numbers have been used.

10. The method of claim 1, wherein in steps (a) and (b), the one-to-one mappings are orthomorphic mappings.

11. The method of claim 1, wherein step (a) comprises the step of:

receiving a first table comprising a set of $2^n$ distinct n-bit input numbers that are added bitwise modulo 2 to a set of $2^n$ distinct n-bit intermediate numbers to obtain a first set of $2^n$ distinct n-bit output numbers, the first set of $2^n$, n-bit output numbers being an orthomorphic mapping of the first set of $2^n$, n-bit input numbers;

and wherein step (b) comprises the step of:

receiving a second table comprising of the set of $2^n$ distinct n-bit input numbers that are added bitwise modulo 2 to a set of $2^n$ distinct n-bit intermediate numbers to obtain the second set of $2^n$ distinct n-bit output numbers, the second set of $2^n$, n-bit output numbers being an orthomorphic mapping of the first set of $2^n$, n-bit input numbers, the second mapping of $2^n$, n-bit output numbers being disjoint from the first mapping of $2^n$, n-bit output numbers.

12. The method of claim 11, further comprising the steps of:

representing each number in the set of $2^n$ n-bit input numbers in the first and second tables by $X_i$, where i=0, . . . , m, $m=2^{n-1}$, n being an integer, the set of $2^n$ n-bit input numbers being arranged in a first order; and representing each number in the set of $2^n$ n-bit intermediate numbers in the first table by $Y_i(I)$, the set of $2^n$ n-bit intermediate numbers $Y_i(I)$ being arranged in a second order, which is compatible with the first order to obtain an orthomorphic mapping;

representing each number in the set of $2^n$ n-bit intermediate numbers in the second table by $Y_i(II)$, the set of $2^n$ n-bit intermediate numbers $Y_i(II)$ being arranged in a third order, which is compatible with the first order to obtain an orthomorphic mapping.

13. The method of claim 12, wherein said second and third orders are different.

14. The method of claim 13, further comprising the steps of:

performing a bit-wise modulo-2 addition of each number $X_i$ with a corresponding number $Y_i(I)$ to obtain the first set of $2^n$ n-bit output numbers $f(X_i)$;

performing a bit-wise modulo-2 addition of each number $X_i$ with a corresponding number $X_i(II)$ to obtain the second set of $2^n$ n-bit output numbers $g(X_i)$, where $f(X_i) \neq g(X_i)$.

15. The method of claim 14, wherein in the step of combining the first and second tables, the orders of the first and the second tables being revised as follows:

(b.1) designating the first table comprising the set of $2^n$ n-bit input numbers $X_i$, the set of $2^n$ n-bit intermediate numbers $Y_i(I)$ and the set of $2^n$ n-bit output numbers $f(X_i)$, as table I and arranging table I as follows:

$$X_0 \oplus Y_0(I) = f(X_0)$$
$$X_1 \oplus Y_1(I) = f(X_1)$$
$$\vdots$$
$$X_i \oplus Y_i(I) = f(X_i)$$
$$\vdots$$
$$X_m \oplus Y_m(I) = f(X_k)$$

(b.2) designating the second table comprising the set of $2^n$ n-bit input numbers $X_i$, the set of $2^n$ n-bit intermediate numbers $Y_i(II)$ and the set of $2^n$ n-bit output numbers $g(X_i)$, as table II and arranging table II as follows:

$$X_0 \oplus Y_0(II) = g(X_0)$$
$$X_1 \oplus Y_1(II) = g(X_1)$$
$$\vdots$$
$$X_i \oplus Y_i(II) = g(X_i)$$
$$\vdots$$
$$X_m \oplus Y_m(II) = g(X_k).$$

16. The method of claim 15, wherein the step of combining comprises the steps of:

combining table I and table II by listing each $2^n$ n-bit input and output numbers in an order as follows:

| | | | | | | | |
|---|---|---|---|---|---|---|---|
| $X_0$ | $\oplus$ | $Y_0(I)$ | = | $Z_{0,0}$ | = | $f(X_0)$ | (from table I) |
| $X_0$ | $\oplus$ | $Y_0(II)$ | = | $Z_{0,1}$ | = | $g(X_0)$ | (from table II) |
| $X_1$ | $\oplus$ | $Y_1(I)$ | = | $Z_{1,1}$ | = | $f(X_1)$ | (from table I) |
| $X_1$ | $\oplus$ | $Y_1(II)$ | = | $Z_{1,2}$ | = | $g(X_1)$ | (from table II) |
| $\vdots$ | | | | | | | |
| $X_i$ | $\oplus$ | $Y_i(I)$ | = | $Z_{i,i}$ | = | $f(X_i)$ | (from table I) |
| $X_i$ | $\oplus$ | $Y_i(II)$ | = | $Z_{i,i+1}$ | = | $g(X_i)$ | (from table II) |
| $\vdots$ | | | | | | | |
| $X_k$ | $\oplus$ | $Y_k(I)$ | = | $Z_{k,k}$ | = | $f(X_k)$ | (from table I) |
| $X_k$ | $\oplus$ | $Y_0(II)$ | = | $Z_{k,k+1}$ | = | $g(X_k)$ | (from table II). |

17. The method of claim 16, wherein the step of combining further comprises the steps of:

(c.6) determining if k=m;

(c.7) if so, terminating the combining step;

(c.8) otherwise selecting a previously unused n-bit intermediate number $Y_{k+1}(I)$ from table I, designating a corresponding input number from table I as $X_{k+1}$, and designating a corresponding output number from table I $f(X_{k+1})$ as $Z_{k+1,k+1}$;

(c.9) obtaining the input number $X_{k+1}$ as provided in step (c.8) from table II, designating a corresponding intermediate number $Y_{k+1}(II)$ from table II, and designating a corresponding output number, $g(X_{k+1})$, as $Z_{k+1,k+2}$;

(c.10) repeating steps (c.8) and (c.9) until $Y_{k+1}$ appears a second time, thereupon terminating the combining step.

18. The method of claim 14, wherein the step of combining comprises the steps of:

(c.1) selecting an n-bit intermediate number $Y_0(I)$ from table I, designating a corresponding n-bit input number $X_0$ from table I and designating a corresponding n-bit output number from table I, $f(X_0)$ as $Z_{0,0}$;

(c.2) obtaining the number $X_0$ as provided in step (c.1) from table II, designating a corresponding n-bit intermediate number $Y_0(II)$ from table II and designating a corresponding n-bit output number from table II, $g(X_0)$, as $Z_{0,1}$;

(c.3) continuing the step of combining by obtaining the n-bit intermediate number $Y_i(II)$ of the previous step from table II, designating the same intermediate number $Y_i(II)$ from table I as $Y_{i+1}(I)$, designating a corresponding n-bit input number $X_{i+1}$ from table I and designating a corresponding n-bit output number from table I, $f(X_{i+1})$, as $Z_{i+1,i+1}$;

(c.4) obtaining the number $X_{i+1}$ in table II, as provided in the previous step from table I, designating a corresponding n-bit intermediate number $Y_{i+1}(II)$ from table II and designating a corresponding n-bit output number from table II, $g(X_{i+1})$, as $Z_{i+1,i+2}$;

(c.5) repeating steps (c.1) and (c.2) for i=1 to k, until $Y_0$ appears a second time.

19. The method of claim 18, wherein steps (c.1) through (c.5) may be represented as follows:

combining table I and table II by listing each $2^n$ n-bit input and output numbers in an order as follows:

| | | | | | | |
|---|---|---|---|---|---|---|
| $\leftarrow$ $X_0$ $\downarrow$ | $\oplus$ | $Y_0(I)$ $\downarrow$ | = | $Z_{0,0}$ | = | $f(X_0)$ (from table I) |
| $\rightarrow$ $X_0$ | $\oplus$ | $Y_0(II)$ $\downarrow$ | = | $Z_{0,1}$ | = | $g(X_0)$ (from table II) |
| $\leftarrow$ $X_1$ $\downarrow$ | $\oplus$ | $Y_1(I)$ $\downarrow$ | = | $Z_{1,1}$ | = | $f(X_1)$ (from table I) |
| $\rightarrow$ $X_1$ | $\oplus$ | $Y_1(II)$ $\downarrow$ | = | $Z_{1,2}$ | = | $g(X_1)$ (from table II) |
| . . . | | | | | | |
| $\leftarrow$ $X_i$ $\downarrow$ | $\oplus$ | $Y_i(I)$ $\downarrow$ | = | $Z_{i,i}$ | = | $f(X_i)$ (from table I) |
| $\rightarrow$ $X_i$ | $\oplus$ | $Y_i(II)$ $\downarrow$ | = | $Z_{i,i+1}$ | = | $g(X_i)$ (from table II) |
| . . . | | | | | | |
| $\leftarrow$ $X_k$ $\downarrow$ | $\oplus$ | $Y_k(I)$ $\downarrow$ | = | $Z_{k,k}$ | = | $f(X_k)$ (from table I) |
| $\rightarrow$ $X_k$ | $\oplus$ | $Y_0(II)$ | = | $Z_{k,k+1}$ | = | $g(X_k)$ (from table II). |

20. The method of claim 19, wherein the step of combining comprises of steps of:
   (i) determining if all m pairs of input and output numbers have been used;
   (ii) if so, terminating the combining step; and
   (iii) if not, selecting a previously unused n-bit intermediate number and continuing with combining step until all m input and output numbers have been used.

21. A method of encryption to be performed by a computer, comprising the steps of:
   (a) receiving a first table comprising a set of $2^n$ distinct n-bit input numbers that are added bitwise modulo 2 to a set of $2^n$ distinct n-bit intermediate numbers to obtain a first set of $2^n$ distinct n-bit output numbers, the first set of $2^n$, n-bit output numbers being an orthomorphic mapping of the first set of $2^n$, n-bit input numbers;
   (b) receiving a second table comprising of the set of $2^n$ distinct n-bit input numbers that are added bitwise modulo 2 to a set of $2^n$ distinct n-bit intermediate numbers to obtain the second set of $2^n$ distinct n-bit output numbers, the second set of $2^n$, n-bit output numbers being an orthomorphic mapping of the first set of $2^n$, n-bit input numbers, the second mapping of $2^n$, n-bit output numbers being disjoint from the first mapping of $2^n$, n-bit output numbers,
   (c) combining the first and the second tables to provide a third table having $2^n$ pairs of n-bit input numbers and $2^n$ pairs of n-bit output numbers, the third table having a predetermined order in which identical input numbers are arranged in pairs and identical output numbers are arranged in pairs;
   (d) generating a first supplemental (n+1)-bit number containing a one in the most significant bit position and a zero in the remaining n-bit positions;
   (e) generating a second supplemental (n+1) bit number having zeroes in each of the (n+1) bit positions;
   (f) selectively adding the first supplemental (n+1)-bit number to one of each pair of said input, said intermediate and said output n-bit numbers and selectively adding the second supplemental (n+1)-bit number to the remaining said input, said intermediate and said output numbers in each pair of the $2^n$ pairs, to obtain a fifth table comprising a set of $2^{n+1}$ distinct (n+1)-bit input numbers and a set of $2^{n+1}$ distinct (n+1)-bit output numbers, the set of $2^{n+1}$, (n+1)-bit output numbers being an orthomorphic mapping of the $2^{n+1}$, (n+1)-bit input numbers; and
   (g) encrypting clear text data by providing (n+1)-bit clear text data as inputs to the fifth table to obtain the corresponding (n+1)-bit output number as cipher text.

22. The method of claim 21, further comprising the steps of:
   representing each number in the set of $2^n$ n-bit input numbers in the first and second tables by $X_i$, where i=0, ..., m, m=$2^n$−1, n being an integer, the set of $2^n$ n-bit input numbers being arranged in a first order; and
   representing each number in the set of $2^n$ n-bit intermediate numbers in the first table by $Y_i(I)$, the set of $2^n$ n-bit intermediate numbers $Y_i(I)$ being arranged in a second order, which is compatible with the first order to obtain an orthormorphic mapping;
   representing each number in the set of $2^n$ n-bit intermediate numbers in the second table by $Y_i(II)$, the set of $2^n$ n-bit intermediate numbers $Y_i(II)$ being arranged in a third order, which is compatible with the first order to obtain an orthormorphic mapping, wherein said second and third orders are different.

23. The method of claim 22, further comprising the steps of:
   performing a bit-wise modulo-2 addition of each input number $X_i$ with a corresponding intermediate number $Y_i(I)$ to obtain the first set of $2^n$ n-bit output numbers $f(X_i)$;
   performing a bit-wise modulo-2 addition of each input number $X_i$ with a corresponding intermediate number $Y_i(II)$ to obtain the second set of $2^n$ n-bit output numbers $g(X_i)$, where $f(X_i) \neq g(X_i)$.

24. The method of claim 23, wherein in the step of combining the first and second tables, the orders of the combined first and second tables being revised as follows:
   (b.1) designating the first table comprising the set of $2^n$ n-bit input numbers $X_i$, the set of $2^n$ n-bit intermediate numbers $Y_i(I)$ and the set of $2^n$ n-bit output numbers $f(X_i)$, as table I and arranging table I as follows:

| | | | | |
|---|---|---|---|---|
| $X_0$ | $\oplus$ | $Y_0(I)$ | = | $f(X_0)$ |
| $X_1$ | $\oplus$ | $Y_1(I)$ | = | $f(X_1)$ |
| . | | . | | . |
| $X_i$ | $\oplus$ | $Y_i(I)$ | = | $f(X_i)$ |
| . | | . | | . |
| $X_k$ | $\oplus$ | $Y_0(I)$ | = | $f(X_k)$ |

(b.2) designating the second table comprising the set of $2^n$ n-bit input numbers $X_i$, the set of $2^n$ n-bit intermediate numbers $Y_i(II)$ and the set of $2^n$ n-bit output numbers $g(X_i)$, as table II and arranging table II as follows:

| | | | | | |
|---|---|---|---|---|---|
| $X_0$ | $\oplus$ | $Y_0(II)$ | $=$ | $g(X_0)$ | |
| $X_1$ | $\oplus$ | $Y_1(II)$ | $=$ | $g(X_1)$ | |
| . | | . | | | |
| $X_i$ | $\oplus$ | $Y_i(II)$ | $=$ | $g(X_i)$ | |
| . | | . | | | |
| $X_k$ | $\oplus$ | $Y_0(II)$ | $=$ | $g(X_k)$. | |

25. The method of claim 24, wherein the step of combining comprises the steps of:
   combining table I and table II by listing each $2^n$ n-bit input and output numbers in an order as follows, where $Y_i(II)$ $Y_{i+1}(I)$ for each i:

| | | | | | | |
|---|---|---|---|---|---|---|
| $X_0$ | $\oplus$ | $Y_0(I)$ | $= Z_{0,0}$ | $=$ | $f(X_0)$ | (from table I) |
| $X_0$ | $\oplus$ | $Y_0(II)$ | $= Z_{0,1}$ | $=$ | $g(X_0)$ | (from Table II) |
| $X_1$ | $\oplus$ | $Y_1(I)$ | $= Z_{1,1}$ | $=$ | $f(X_1)$ | (from table I) |
| $X_1$ | $\oplus$ | $Y_1(II)$ | $= Z_{1,2}$ | $=$ | $g(X_1)$ | (from table II) |
| . | | | | | | |
| $X_i$ | $\oplus$ | $Y_i(I)$ | $= Z_{i,i}$ | $=$ | $f(X_i)$ | (from table I) |
| $X_i$ | $\oplus$ | $Y_i(II)$ | $= Z_{i,i+1}$ | $=$ | $g(X_i)$ | (from table II) |
| . | | | | | | |
| $X_k$ | $\oplus$ | $Y_k(I)$ | $= Z_{k,k}$ | $=$ | $f(X_k)$ | (from table I) |
| $X_k$ | $\oplus$ | $Y_0(II)$ | $= Z_{k,k+1}$ | $=$ | $g(X_k)$ | (from table II). |

26. The method of claim 25, wherein steps (c.1) through (c.7) may be represented as follows:
   combining table I and table II by listing each $2^n$ n-bit input and output numbers in an order as follows:

| | | | | | | |
|---|---|---|---|---|---|---|
| $\leftarrow$ $X_0$ $\downarrow$ | $\oplus$ | $Y_0(I)$ | $= Z_{0,0}$ | $=$ | $f(X_0)$ | (from table I) |
| $\rightarrow$ $X_0$ | $\oplus$ | $Y_0(II)$ $\downarrow$ | $= Z_{0,1}$ | $=$ | $g(X_0)$ | (from table II) |
| $\leftarrow$ $X_1$ $\downarrow$ | $\oplus$ | $Y_1(I)$ | $= Z_{1,1}$ | $=$ | $f(X_1)$ | (from table I) |
| $\rightarrow$ $X_1$ | $\oplus$ | $Y_1(II)$ $\downarrow$ | $= Z_{1,2}$ | $=$ | $g(X_1)$ | (from table II) |
| . | | | | | | |
| $\leftarrow$ $X_i$ $\downarrow$ | $\oplus$ | $Y_i(I)$ | $= Z_{i,i+1}$ | $=$ | $f(X_i)$ | (from table I) |
| $\rightarrow$ $X_i$ | $\oplus$ | $Y_i(II)$ $\downarrow$ | $= Z_{i,i+1}$ | $=$ | $g(X_i)$ | (from table II) |
| . | | | | | | |
| $\leftarrow$ $X_k$ $\downarrow$ | $\oplus$ | $Y_k(I)$ | $= Z_{k,k}$ | $=$ | $f(X_k)$ | (from table I) |
| $\rightarrow$ $X_k$ | $\oplus$ | $Y_0(II)$ | $= Z_{k,k+1}$ | $=$ | $g(X_k)$ | (from table II). |

27. The method of claim 26, wherein the step of combining comprises of steps of:
   (i) determining if all m pairs of input and output numbers have been used;
   (ii) if so, terminating the combining step; and
   (iii) if not, selecting a previously unused set of input numbers and continuing with combining step until all m input and output numbers have been used.

28. The method of claim 25, wherein the step of combining further comprises the steps of:
   (c.6) determining if k=m;
   (c.7) if so, terminating the combining step;
   (c.8) otherwise selecting a previously unused n-bit intermediate number $Y_{k+1}(I)$ from table I, designating a corresponding input number from table I as $X_{k+1}$, and designating a corresponding output number from table I $f(X_{k+1})$ as $Z_{k+1,k+1}$;
   (c.9) selecting the input number $X_{k+1}$ as provided in step (c.8) from table II, designating a corresponding intermediate number $Y_{k+2}(II)$ from table II, and designating a corresponding output number, $g(X_{k+1})$, as $Z_{k+1,k+2}$;
   (c.10) repeating steps (c.8) and (c.9) until $Y_{k+1}$ appears a second time, thereupon terminating the combining step.

29. The method of claim 23, wherein the step of combining comprises the steps of:
   (c.1) selecting an n-bit intermediate number $Y0(I)$ from table I, designating a corresponding n-bit input number $X_0$ from table I and designating a corresponding n-bit output number from table I, $f(X_0)$ as $Z_{0,0}$;
   (c.2) obtaining the input number $X_0$ as provided in step (c.1) from table II, designating a corresponding n-bit intermediate number $Y1(II)$ from table II and designating a corresponding n-bit output number from table II, $g(X_0)$, as $Z_{0,1}$;
   (c.3) continuing the step of combining by obtaining the n-bit intermediate number $Y_i(II)$ of the previous step from table II, designating the same intermediate number $Y_i(II)$ from table I as $Y_{i+1}(I)$, designating a corresponding n-bit input number $X_{i+1}$ from table I and designating a corresponding n-bit output number from table I, $f(X_{i+1})$ as $Z_{i+1,i+1}$;
   (c.4) obtaining the number $X_{i+1}$ in table II as provided in the previous step from table I, designating a corresponding n-bit intermediate number $Y_{i+1}(II)$ from table II and designating a corresponding n-bit output from number table II, $g(X_{i+1})$, as $Z_{i+1,i+2}$;
   (c.5) repeating steps (c.3) and (c.4) for i=1 to m until $Y_0$ appears a second time.

30. The method of claim 29, wherein the step of selectively adding, said first supplemental (n+1)-bit number is added to one of each pair of said input, said intermediate, and said output n-bit numbers in the combined table, and wherein the step of selectively adding further comprises the step of adding the second supplemental (n+1)-bit number to each of the remaining said input, said intermediate and said output numbers so that each corresponding resulting input, intermediate and output numbers in the combined table has a selected one of:
   (i) two of said first supplemental numbers and one of said second supplemental number added in a first predetermined order; or
   (ii) three of said second supplemental numbers added in a second predetermined order; and
   wherein the resulting combined (n+1)-bit table is an orthomorphic mapping.

31. The method of claim 30, wherein the step of selectively adding further comprises the steps of
   adding said first supplemental number to said one of each pair of output n-bit numbers in the combined table; and adding said second supplemental number to the other of each pair of output n-bit numbers in the combined table.

32. The method of claim 31, wherein the step of selectively adding comprises the steps of:
   (i) selecting one of said first or said second supplemental numbers and adding the selected one of said first or second supplemental number to the intermediate number $Y_0(I)$; and
   (ii) obtaining one of said first or said second supplemental numbers and adding the obtained one of said first or second supplemental numbers to the corresponding input number $X_0$ from table I, so that a totality of said first or said second supplemental numbers added to $X_0 \oplus Y_0(I) = Z_{0,0}$ is either zero or two.

33. The method of claim 32, wherein the step of selectively adding further comprises the steps of:
   (iii) continuing with the selectively adding step by obtaining the input number $X_i$ from table II and adding an opposite supplemental number from the supplemental number that was added to $X_i$ from table I in the previous step, to the input number $X_i$ from table II;
   (iv) obtaining the corresponding intermediate number $Y_i(II)$ and adding said first or said second supplemental number to $Y_i(II)$ so that a totality of said first supplemental numbers added to $X_i \oplus Y_i(II) = Z_{i,i+1}$ is either zero or two;
   (v) obtaining $Y_{i+1}(I)$ from table I, where $Y_{i+1}(I) = Y_i(II)$, and adding an opposite supplemental number from the supplemental number that was added to $Y_i(II)$ of the previous step, to $Y_{i+1}(I)$;
   (vi) performing steps (iii) to (v) for i=0 to m.

34. The method of claim 33, wherein the number of first and the number of second supplemental numbers added to the output numbers Z, in each cycle is even.

* * * * *

UNITED STATES PATENT AND TRADEMARK OFFICE
CERTIFICATE OF CORRECTION

PATENT NO. : 6,035,042
DATED : March 7, 2000
INVENTOR(S) : Lothrop Mittenthal

It is certified that error appears in the above-indentified patent and that said Letters Patent is hereby corrected as shown below:

On the title page, item [54], Title, please delete "HIGH SPEED" and insert in lieu thereof --APPARATUS--.

Signed and Sealed this

Twentieth Day of March, 2001

Attest:

NICHOLAS P. GODICI

Attesting Officer      Acting Director of the United States Patent and Trademark Office